United States Patent
He et al.

(10) Patent No.: US 12,204,186 B2
(45) Date of Patent: Jan. 21, 2025

(54) PRIVACY FILTER, DISPLAY PANEL, AND DISPLAY DEVICE

(71) Applicant: Wuhan China Star Optoelectronics Technology Co., Ltd., Wuhan (CN)

(72) Inventors: Rui He, Wuhan (CN); Wei Cheng, Wuhan (CN); Changchih Huang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/605,054

(22) PCT Filed: Sep. 7, 2021

(86) PCT No.: PCT/CN2021/116979
§ 371 (c)(1),
(2) Date: Oct. 20, 2021

(87) PCT Pub. No.: WO2023/015645
PCT Pub. Date: Feb. 16, 2023

(65) Prior Publication Data
US 2024/0019725 A1    Jan. 18, 2024

(30) Foreign Application Priority Data
Aug. 13, 2021    (CN) .......................... 202110932688.7

(51) Int. Cl.
*G02F 1/13*    (2006.01)
*G02F 1/1334*    (2006.01)
(Continued)

(52) U.S. Cl.
CPC ........ *G02F 1/1323* (2013.01); *G02F 1/13345* (2021.01); *G02F 1/133528* (2013.01);
(Continued)

(58) Field of Classification Search
CPC ............. G02F 1/1323; G02F 1/133531; G02F 1/13345; G02F 1/1334; G02F 1/133528
See application file for complete search history.

(56) References Cited

U.S. PATENT DOCUMENTS

2006/0103782 A1*  5/2006  Adachi ............. G02F 1/133632
                                                     349/96
2017/0371188 A1* 12/2017  Chen ....................... G02F 1/137
(Continued)

FOREIGN PATENT DOCUMENTS

| CN | 103513463 A | 1/2014 |
|----|-------------|--------|
| CN | 105700237 A | 6/2016 |

(Continued)

OTHER PUBLICATIONS

International Search Report in International application No. PCT/CN2021/116979, mailed on Apr. 26, 2022.
(Continued)

*Primary Examiner* — Jia X Pan
(74) *Attorney, Agent, or Firm* — Nathan & Associates; Menachem Nathan

(57) ABSTRACT

A privacy filter, a display panel, and a display device are provided. The display panel includes a panel body, and a first polarizer, a dimming liquid crystal layer, and a second polarizer that are sequentially disposed on one side of the panel body. The dimming liquid crystal layer includes a plurality of polymer networks and a plurality of liquid crystal molecules distributed in the polymer networks, wherein the plurality of polymer networks are arranged in a first direction, the first direction tilts relative to a normal direction of the first polarizer, and an optical axis direction of the first polarizer is parallel to an optical axis direction of the second polarizer.

20 Claims, 10 Drawing Sheets

(51) Int. Cl.
    *G02F 1/1335*    (2006.01)
    *G02F 1/1337*    (2006.01)
    *G02F 1/137*     (2006.01)

(52) U.S. Cl.
    CPC .. *G02F 1/133531* (2021.01); *G02F 1/133753* (2013.01); *G02F 1/13706* (2021.01); *G02F 1/13712* (2021.01); *G02F 2413/08* (2013.01); *G02F 2413/12* (2013.01)

(56) References Cited

U.S. PATENT DOCUMENTS

| | | | |
|---|---|---|---|
| 2018/0113334 A1* | 4/2018 | Fang | G02F 1/133528 |
| 2018/0210243 A1* | 7/2018 | Fang | G02F 1/137 |
| 2019/0196236 A1* | 6/2019 | Chen | G02F 1/1323 |
| 2020/0249505 A1* | 8/2020 | Fang | G02F 1/13363 |

FOREIGN PATENT DOCUMENTS

| | | |
|---|---|---|
| CN | 106019681 A | 10/2016 |
| CN | 108345139 A | 7/2018 |
| CN | 208126055 U | 11/2018 |
| CN | 110361883 A | 10/2019 |
| CN | 211554556 U | 9/2020 |
| CN | 111796438 A | 10/2020 |
| JP | 2008096458 A | 4/2008 |

OTHER PUBLICATIONS

Written Opinion of the International Search Authority in International application No. PCT/CN2021/116979, mailed on Apr. 26, 2022.

* cited by examiner

PRIVACY FILTER, DISPLAY PANEL, AND DISPLAY DEVICE

FIELD OF INVENTION

The present disclosure relates to the field of display technologies, and in particular, to a privacy filter, a display panel, and a display device having the display panel.

BACKGROUND OF INVENTION

In the rapidly developed information age, people start to pay more attention to personal information protection. Therefore, one type of displays having an anti-spy function emerge as the times require. Such type of displays can only provide readability of displayed content to a user at a front viewing angle, and bystanders on the sides cannot see the displayed content, thereby effectively protecting information privacy of the user.

Currently, most anti-spy components are one layer of anti-spy protection film, but the anti-spy protection film cannot automatically perform switch between anti-spy and normal display. Another display technology having anti-spy and switch functions is to design a display, for example, perform a special patterned design on an electrode layer on a substrate. However, such type of displays may generally affect display effects, leading to a decrease in contrast, generation of color cast, and relatively poor resolution. Therefore, the conventional anti-spy technologies are incomplete in terms of an adjustable viewing angle range.

SUMMARY OF INVENTION

Technical Problem

Embodiments of the present disclosure provide a privacy filter, a display panel, and a display device, which can selectively transmit light at different viewing angles, to further play a role of anti-spy at a specific viewing angle. In addition, the display panel provided in the present disclosure may further switch between anti-spy display and general display, to improve the applicability of the display panel.

Technical Solution

An embodiment of the present disclosure provides a display panel, including:
  a panel body;
  a first polarizer, disposed on one side of the panel body;
  a dimming liquid crystal layer, disposed on one side of the first polarizer away from the panel body and including a plurality of polymer networks and a plurality of liquid crystal molecules distributed in the polymer networks, wherein the plurality of polymer networks are arranged in a first direction, and the first direction tilts relative to a normal direction of the first polarizer; and
  a second polarizer, disposed on one side of the dimming liquid crystal layer away from the first polarizer, an optical axis direction of the first polarizer being parallel to an optical axis direction of the second polarizer, wherein
  in a first mode, long axes of the plurality of liquid crystal molecules are arranged in the first direction; and
  in a second mode, the long axes of the plurality of liquid crystal molecules are arranged in a second direction, the second direction is different from the first direction, and a viewing angle of the display panel in the first model is less than a viewing angle of the display panel in the second mode.

In an embodiment of the present disclosure, when the display panel is in the first mode, orthogonal projections of the long axes of the plurality of liquid crystal molecules on the first polarizer are parallel to an optical axis of the first polarizer.

In an embodiment of the present disclosure, an angle between the first direction and the normal direction of the first polarizer is an acute angle.

In an embodiment of the present disclosure, the angle between the first direction and the normal direction of the first polarizer is greater than or equal to 1° and is less than or equal to 89°.

In an embodiment of the present disclosure, the angle between the first direction and the normal direction of the first polarizer is greater than or equal to 55° and is less than or equal to 89°.

In an embodiment of the present disclosure, a first electrode layer is disposed between the first polarizer and the dimming liquid crystal layer, and a second electrode layer is disposed between the second polarizer and the dimming liquid crystal layer, wherein the first electrode layer and the second electrode layer are configured to load voltages to control the long axes of the plurality of liquid crystal molecules to switch between the first direction and the second direction.

In an embodiment of the present disclosure, a first alignment layer is disposed between the first electrode layer and the dimming liquid crystal layer, a second alignment layer is disposed between the second electrode layer and the dimming liquid crystal layer, and both a pre-tilt direction of the first alignment layer and a pre-tilt direction of the second alignment layer are parallel to the first direction.

In an embodiment of the present disclosure, the plurality of liquid crystal molecules are positive liquid crystals, and the second direction is parallel to a normal direction of the first polarizer; or
  the plurality of liquid crystal molecules are negative liquid crystals, and the second direction is perpendicular to the normal direction of the first polarizer.

In an embodiment of the present disclosure, the display panel further includes a third polarizer disposed on one side of the panel body away from the first polarizer, and an optical axis direction of the third polarizer is perpendicular to the optical axis direction of the first polarizer.

In an embodiment of the present disclosure, the display panel further includes a phase compensation module disposed between the first polarizer and the dimming liquid crystal layer, and the phase compensation module includes a positive single-axis C-type compensation film, a negative single-axis C-type compensation film, or at least one A-type compensation film.

In an embodiment of the present disclosure, the phase compensation module includes a first A-type compensation film and a second A-type compensation film stacked, and an optical axis direction of the first A-type compensation film and an optical axis direction of the second A-type compensation film are arranged orthogonally.

According to the foregoing objective of the present disclosure, a display device is provided, including a display panel and a backlight module located on one side of the display panel, the display panel including:
- a panel body;
- a first polarizer, disposed on one side of the panel body;
- a dimming liquid crystal layer, disposed on one side of the first polarizer away from the panel body and including a plurality of polymer networks and a plurality of liquid crystal molecules distributed in the polymer networks, wherein the plurality of polymer networks are arranged in a first direction, and the first direction tilts relative to a normal direction of the first polarizer; and
- a second polarizer, disposed on one side of the dimming liquid crystal layer away from the first polarizer, an optical axis direction of the first polarizer being parallel to an optical axis direction of the second polarizer, wherein
- in a first mode, long axes of the plurality of liquid crystal molecules are arranged in the first direction; and
- in a second mode, the long axes of the plurality of liquid crystal molecules are arranged in a second direction, the second direction is different from the first direction, and a viewing angle of the display panel in the first model is less than a viewing angle of the display panel in the second mode.

In an embodiment of the present disclosure, the backlight module includes a collimating backlight source.

According to the foregoing objective of the present disclosure, a privacy filter is provided, including:
- a first polarizer;
- a dimming liquid crystal layer, disposed on one side of the first polarizer and including a plurality of polymer networks and a plurality of liquid crystal molecules distributed in the polymer networks, wherein the plurality of polymer networks are arranged in a first direction, and the first direction tilts relative to a normal direction of the first polarizer; and
- a second polarizer, disposed on one side of the dimming liquid crystal layer away from the first polarizer, an optical axis direction of the first polarizer being parallel to an optical axis direction of the second polarizer, wherein
- in a first mode, long axes of the plurality of liquid crystal molecules are arranged in the first direction; and
- in a second mode, the long axes of the plurality of liquid crystal molecules are arranged in a second direction, the second direction is different from the first direction, and a viewing angle of the privacy filter in the first model is less than a viewing angle of the privacy filter in the second mode.

In an embodiment of the present disclosure, when the privacy filter is in the first mode, orthogonal projections of the long axes of the plurality of liquid crystal molecules on the first polarizer are parallel to an optical axis of the first polarizer.

In an embodiment of the present disclosure, an angle between the first direction and the normal direction of the first polarizer is an acute angle.

In an embodiment of the present disclosure, the angle between the first direction and the normal direction of the first polarizer is greater than or equal to 55° and is less than or equal to 89°.

In an embodiment of the present disclosure, a first electrode layer is disposed between the first polarizer and the dimming liquid crystal layer, and a second electrode layer is disposed between the second polarizer and the dimming liquid crystal layer, wherein the first electrode layer and the second electrode layer are configured to load voltages to control the long axes of the plurality of liquid crystal molecules to switch between the first direction and the second direction.

In an embodiment of the present disclosure, a first alignment layer is disposed between the first electrode layer and the dimming liquid crystal layer, a second alignment layer is disposed between the second electrode layer and the dimming liquid crystal layer, and both a pre-tilt direction of the first alignment layer and a pre-tilt direction of the second alignment layer are parallel to the first direction.

In an embodiment of the present disclosure, the plurality of liquid crystal molecules are positive liquid crystals, and the second direction is parallel to a normal direction of the first polarizer; or
the plurality of liquid crystal molecules are negative liquid crystals, and the second direction is perpendicular to the normal direction of the first polarizer.

Beneficial Effects

Compared to the related art, the present disclosure arranges the plurality of polymer networks in the dimming liquid crystal layer in a direction inclined to the normal direction of the first polarizer, to provide a directing effect to the plurality of liquid crystal molecules, so that the long axes of the plurality of liquid crystal molecules are also inclined to the normal direction of the first polarizer. Due to a light deflection characteristic of the plurality of liquid crystal molecules, first light incident in the normal direction of the first polarizer passes through the second polarizer, and second light incident in a direction inclined to the normal direction of the first polarizer is blocked or partially blocked by the second polarizer. As a result, the display panel provided in the present disclosure may selectively transmit light at different viewing angles, to further play a role of anti-spy at a specific viewing angle. In addition, the display panel provided in the present disclosure may further switch between anti-spy display and general display, to improve the applicability of the display panel.

BRIEF DESCRIPTION OF DRAWINGS

The following describes specific implementations of the present disclosure in detail with reference to the accompanying drawings, to make the technical solutions and other beneficial effects of the present disclosure apparent.

DETAILED DESCRIPTION OF PREFERRED EMBODIMENTS

The following clearly and completely describes technical solutions in the embodiments of the present disclosure with reference to the accompanying drawings in the embodiments of the present disclosure. Apparently, the described embodiments are merely some embodiments rather than all the embodiments of the present disclosure. All other embodiments obtained by a person skilled in the art based on the embodiments of this application without creative efforts shall fall within the protection scope of the present disclosure.

Many different implementations or examples are provided below to implement different structures of the present disclosure. To simplify the disclosure of the present disclosure, the following describes components and settings of particular examples. Certainly, the components and settings are merely examples, and are not intended to limit the present disclosure. In addition, in the present disclosure, reference numbers and/or reference letters may be repeated in different examples. Such repetition is intended to simplify and clarify the present disclosure, and does not indicate a relationship between various implementations and/or settings that are discussed. In addition, the present disclosure provides examples of various specific processes and materials, but a person of ordinary skill in the art may be aware of the applicability of other processes and/or the use of other materials.

Figure 1:
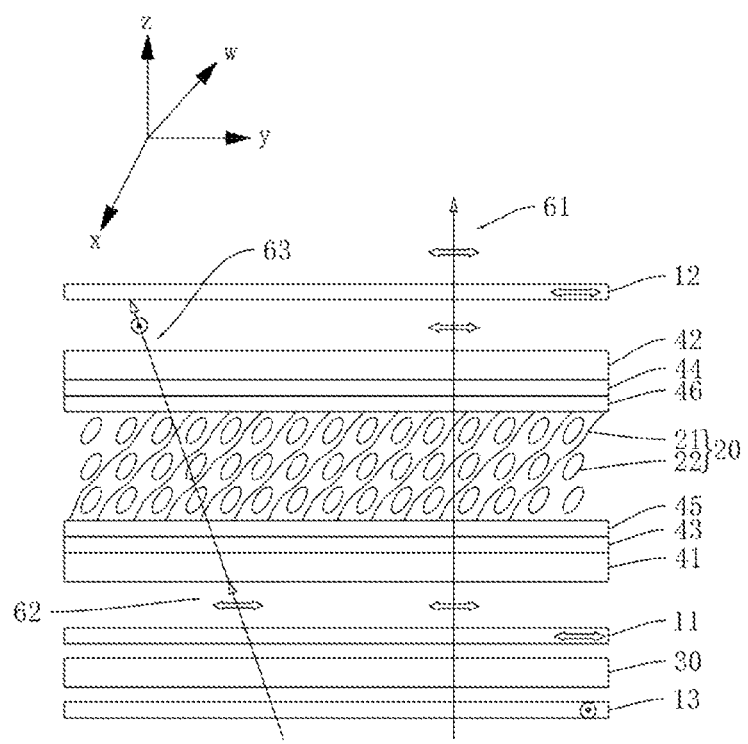
FIG. 1 is a schematic diagram of a structure of a display panel according to an embodiment of the present disclosure.
Figure 2:
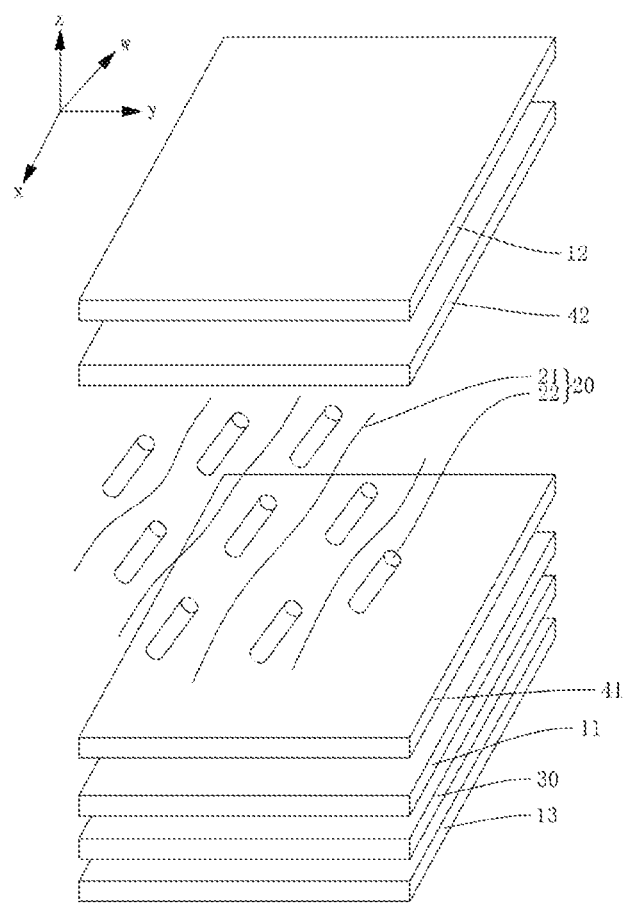
FIG. 2 is a schematic diagram of a three-dimensional structure of a display panel according to an embodiment of the present disclosure.

An embodiment of the present disclosure provides a display panel. Referring to FIGS. 1 and 2, the display panel includes a panel body 30, a first polarizer 11, a dimming liquid crystal layer 20, and a second polarizer 12.

The first polarizer 11 and the second polarizer 12 are disposed opposite to each other, an optical axis direction of the first polarizer 11 is parallel to an optical axis direction of the second polarizer, and the panel body is disposed on one side of the first polarizer 11 away from the second polarizer 12.

The dimming liquid crystal layer 20 is disposed between the first polarizer 11 and the second polarizer 12, and the dimming liquid crystal layer 20 includes a plurality of polymer networks 21 and a plurality of liquid crystal molecules 22 distributed among the plurality of polymer networks 21, wherein the plurality of polymer networks 21 are arranged in a first direction w, and the first direction w tilts relative to a normal direction of the first polarizer 11.

Further, in a first mode, long axes of the plurality of liquid crystal molecules 22 are arranged in the first direction w.

In a second mode, the long axes of the plurality of liquid crystal molecules 22 are arranged in a second direction, the second direction is different from the first direction w, and a viewing angle of the display panel in the first model is less than a viewing angle of the display panel in the second mode.

It should be noted that, in the embodiments of the present disclosure, the first mode of the display panel may be an anti-spy display mode, and the second mode of the display panel may be a general display mode. In addition, the dimming liquid crystal layer 20 is configured to, in the first mode, cause first light 61 incident in a normal direction z of the first polarizer 11 to pass through the second polarizer 12, and cause second light 62 incident in a direction inclined to the normal direction z of the first polarizer 11 to be blocked or partially blocked by the second polarizer 12. In the second mode, the long axes of the plurality of liquid crystal molecules 22 are different from the first direction, more light are caused to pass through the second polarizer 12, to improve a viewing angle range of the display panel in the second mode, thereby causing a viewing angle of the display panel in the second mode to be greater than a viewing angle of the display panel in the first mode.

In an implementation application process, the embodiments of the present disclosure arrange the plurality of polymer networks 21 in the dimming liquid crystal layer 20 in a direction inclined to the normal direction z of the first polarizer 11, to provide a directing effect to the plurality of liquid crystal molecules 22, so that the long axes of the plurality of liquid crystal molecules 22 are also inclined to the normal direction z of the first polarizer 11. Due to a light deflection characteristic of the plurality of liquid crystal molecules 22, first light incident in the normal direction z of the first polarizer 11 passes through the second polarizer 12, and second light incident in a direction inclined to the normal direction z of the first polarizer 11 is blocked or partially blocked by the second polarizer 12. The display panel provided in the embodiments of the present disclosure can selectively transmit light at different viewing angles, to further play a role of anti-spy at a specific viewing angle. In addition, the display panel provided in the present disclosure may further switch between anti-spy display and general display, to improve the applicability of the display panel.

Described in detail, still referring to FIGS. 1 and 2, in the embodiments of the present disclosure, the display panel includes the first polarizer 11 and the second polarizer 12 that are disposed opposite to each other, the dimming liquid crystal layer 20 disposed between the first polarizer 11 and the second polarizer 12, the panel body 30 disposed on one side of the first polarizer 11 away from the second polarizer 12, and a third polarizer 13 disposed on one side of the panel body 30 away from the first polarizer 11.

The optical axis direction of the first polarizer 11 is parallel to the optical axis direction of the second polarizer 12, and the optical axis direction of the first polarizer 11 is perpendicular to an optical axis direction of the third polarizer 13.

Optionally, in the embodiments of the present disclosure, the optical axis direction of the first polarizer 11 and the optical axis direction of the second polarizer 12 are both parallel to a third direction y, and the optical axis direction of the third polarizer 13 is parallel to a fourth direction x. The panel body 30 is located between the first polarizer 11 and the third polarizer 13, to implement a normal display function of the panel body 30. The dimming liquid crystal layer 20 is disposed between the first polarizer 11 and the second polarizer 12, to implement an anti-spy function of the display panel.

Described in detail, the display panel further includes a first substrate 41 and a second substrate 42 that are disposed opposite to each other, a first electrode layer 43 disposed on one side of the first substrate 41 close to the second substrate 42, a second electrode layer 44 disposed on one side of the second substrate 42 close to the first substrate 41, a first alignment layer 45 disposed on one side of the first electrode layer 43 close to the second electrode layer 44, a second alignment layer 46 disposed on one side of the second electrode layer 44 close to the first electrode layer 43, and the dimming liquid crystal layer 20 disposed between the first alignment layer 45 and the second alignment layer 46.

It should be noted that, in the embodiments of the present disclosure, the first substrate 41 and the second substrate 42 are disposed between the first polarizer 11 and the second polarizer 12, the first substrate 41 is located between the first polarizer 11 and the second substrate 42, and the second substrate 42 is located between the first substrate 41 and the second polarizer 12, so that the dimming liquid crystal layer 20 is further located between the first polarizer 11 and the second polarizer 12.

In the embodiments of the present disclosure, the dimming liquid crystal layer 20 includes a plurality of polymer networks 21 disposed between the first alignment layer 45 and the second alignment layer 46 and a plurality of liquid crystal molecules 22 distributed in the plurality of polymer networks 21, and the plurality of polymer networks 21 are arranged in the first direction w, to provide a directing effect to the plurality of liquid crystal molecules 22 located in the polymer networks in the first direction w. In addition, pre-tilt directions formed by the first alignment layer 45 and the second alignment layer 46 in an alignment process are both parallel to the first direction w, so that the plurality of polymer networks 21 arranged in the first direction w are obtained in manufacturing.

In the embodiments of the present disclosure, the first electrode layer 43 and the second electrode layer 44 are configured to load voltages to control the long axes of the plurality of liquid crystal molecules 22 to switch between the first direction w and the second direction. When a voltage difference between the first electrode layer 43 and the second electrode layer 44 is less than a threshold, the long axes of the plurality of liquid crystal molecules 22 are arranged in the first direction w, and when the voltage difference between the first electrode layer 43 and the second electrode layer 44 is greater than the threshold, the long axes of the plurality of liquid crystal molecules 22 are arranged in the second direction. The threshold may be selected according to an actual requirement and is not limited herein.

Optionally, when the first electrode layer 43 and the second electrode layer 44 do not apply voltages, the plurality of liquid crystal molecules 22 are arranged in the first direction w, to cause the display panel to be in the first mode. The dimming liquid crystal layer 20 is configured to, in the first mode, cause the first light 61 incident in the normal direction z of the first polarizer 11 to pass through the second polarizer 12, and cause the second light 62 incident in a direction inclined to the normal direction z of the first polarizer 11 to be blocked or partially blocked by the second polarizer 12.

It should be noted that, When the display panel is in the first mode, orthogonal projections of the long axes of the plurality of liquid crystal molecules 22 on the first polarizer 11 are parallel to an optical axis of the first polarizer 11.

Described in detail, after the first light 61 and the second light 62 pass through the third polarizer 13 and the panel body 30, a polarization direction of the first light 61 and a polarization direction of the second light 62 are both parallel to the third direction y.

Based on the above, both the first light 61 and the second light 62 spread in an x-z plane, the plurality of polymer networks 21 and the plurality of liquid crystal molecules 22 are obliquely arranged in a y-z plane, the first light 61 is incident into the dimming liquid crystal layer 20 in the normal direction z of the first polarizer 11, and the second light 62 is incident into the dimming liquid crystal layer 20 in a direction inclined to the normal direction z of the first polarizer 11. Since the first light 61 is incident in the normal direction of the first polarizer 11, the first light 61 is in a same plane as the plurality of liquid crystal molecules 22 in a three-dimensional space, and the polarization direction of the first light 61 only pass through the long axes of the plurality of liquid crystal molecules 22. Therefore, no phase difference is generated after the first light 61 passes through the dimming liquid crystal layer 20, namely, the first light does not deflect. When the first light 61 reaches the second polarizer 12, the polarization direction of the first light is still the third direction y, so that the first light may pass through the second polarizer 12.

In addition, an incident direction of the second light 62 is inclined to the normal direction z of the first polarizer 11, so that in a three-dimensional space, the polarization direction of the second light 62 and the long axes of the plurality of liquid crystal molecules 22 form a certain angle. Therefore, a phase difference may be generated after the second light 62 passes through the dimming liquid crystal layer 20, namely, the second light deflects. The second light 62 deflects into third light 63, and the polarization direction changes, so that the second light cannot directly pass through the second polarizer 12. If a polarization direction of the third light 63 is perpendicular to the third direction y, as shown in FIG. 1, the third light 63 may be totally blocked by the second polarizer 12. In this case, the user can only view the display panel at a front viewing angle, and the display panel displays no picture at other viewing angles, to play a role of anti-spy. If the polarization direction of the third light 63 forms an acute angle with both the third direction y and the fourth direction x, the third light 63 is decomposed in the third direction y and the fourth direction x, wherein only a part of third light 63 decomposed in the third direction y can pass through the second polarizer 12. In this case, the user can view the display panel normally at a front viewing angle, and display luminance of the display panel may be relatively dark at other viewing angles, to play a role of anti-spy.

Further, in a process that the second light 62 deflects into the third light 63, light spreads in two directions of the plurality of liquid crystal molecules 22, to further generate a phase difference, and the phase difference $Re=\lambda/2+n\lambda$ (n is an integer), wherein $\lambda$ is a wavelength of light in a vacuum. As can be learned from the formula, when a vibration direction of polarized light of the second light 62 and the long axes of the plurality of liquid crystal molecules 22 form an angle of 45°, the polarization direction deflects by 90° after the second light 62 passes through the plurality of liquid crystal molecules 22. That is, the polarization direction of the obtained third light 63 is parallel to the fourth direction x, and the third light 63 is totally blocked by the second polarizer 12.

Optionally, when the first electrode layer 43 and the second electrode layer 44 apply voltages, the plurality of liquid crystal molecules 22 may be controlled to deflect, to cause the long axes of the plurality of liquid crystal molecules 22 to be arranged in the second direction, and the second direction is different from the first direction w, so as to cause the display panel to be in the second mode.

Figure 3:
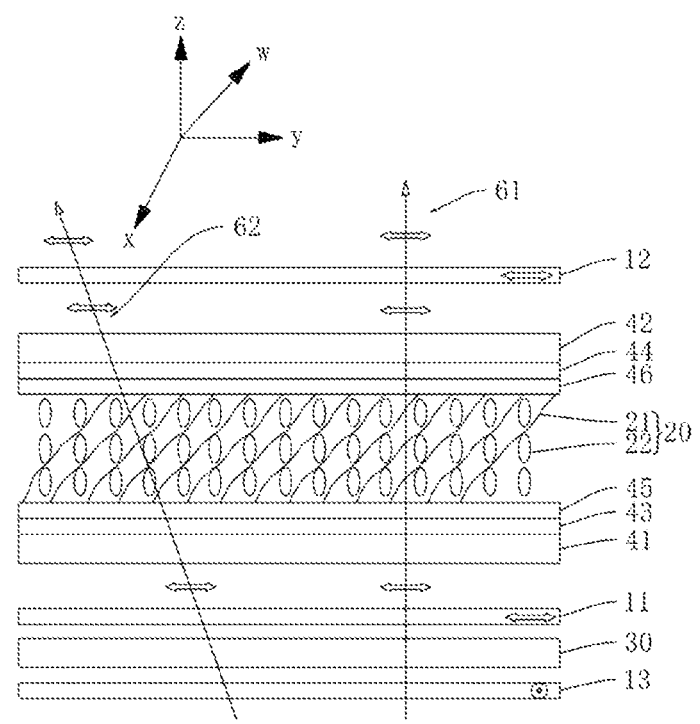
FIG. 3 is a schematic diagram of another structure of a display panel according to an embodiment of the present disclosure.
Figure 4:
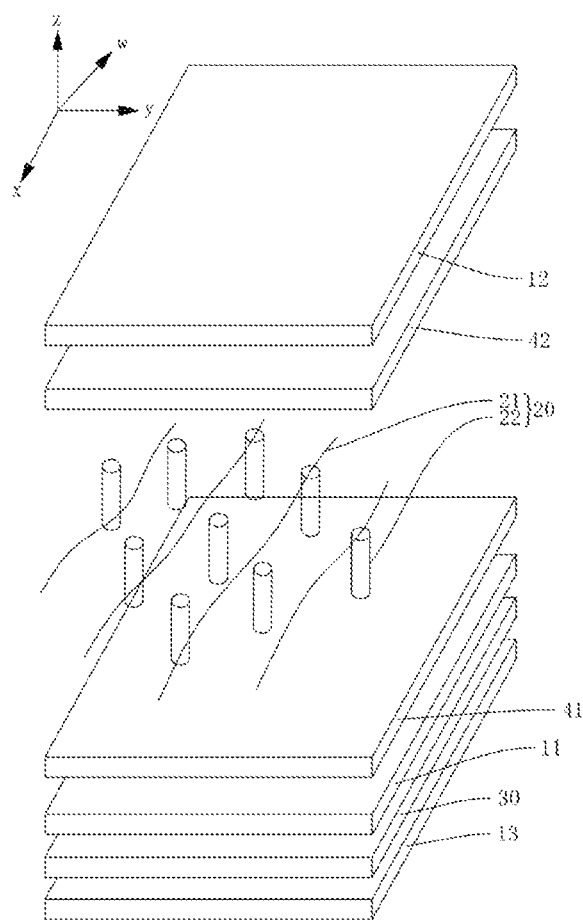
FIG. 4 is a schematic diagram of another three-dimensional structure of a display panel according to an embodiment of the present disclosure.

In an embodiment of the present disclosure, referring to FIGS. 3 and 4, when the plurality of liquid crystal molecules 22 are positive liquid crystals, the second direction is parallel to the normal direction z of the first polarizer 11. In this case, the polarization directions of the first light 61 and the second light 62 are both parallel to short axes of the plurality of liquid crystal molecules, and the first light 61 and the second light 62 both do no deflect during passing through the dimming liquid crystal layer 20. That is, when the first light 61 and the second light 62 reach the second polarizer 12, the polarization directions of the first light 61 and the second light 62 are both parallel to the third direction y, and the first light 61 and the second light 62 can both pass through the second polarizer 12, to cause the display panel to be in the second mode. In addition, the display panel provided in the embodiments of the present disclosure may not affect, in the second mode, light passing through the panel body 30 and the first polarizer 11, thereby further improving a display effect of the display panel in the second mode.

Figure 5:
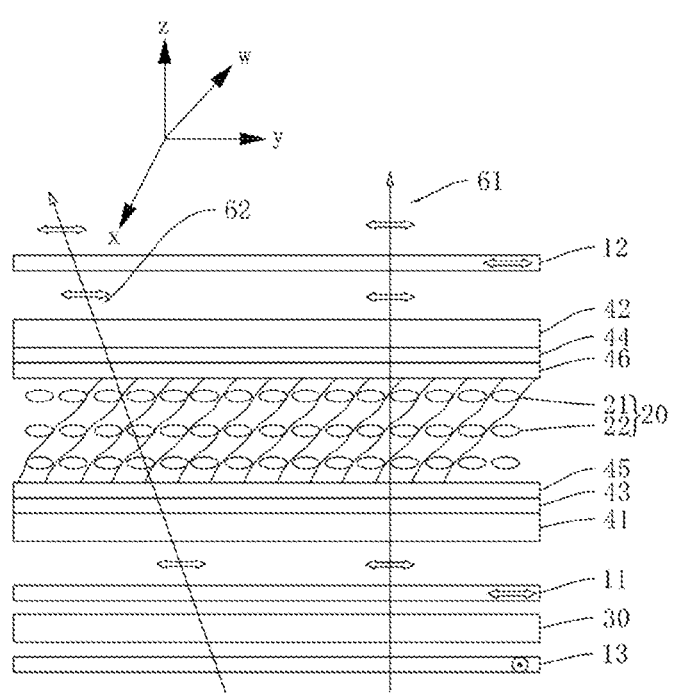
FIG. 5 is a schematic diagram of another structure of a display panel according to an embodiment of the present disclosure.
Figure 6:
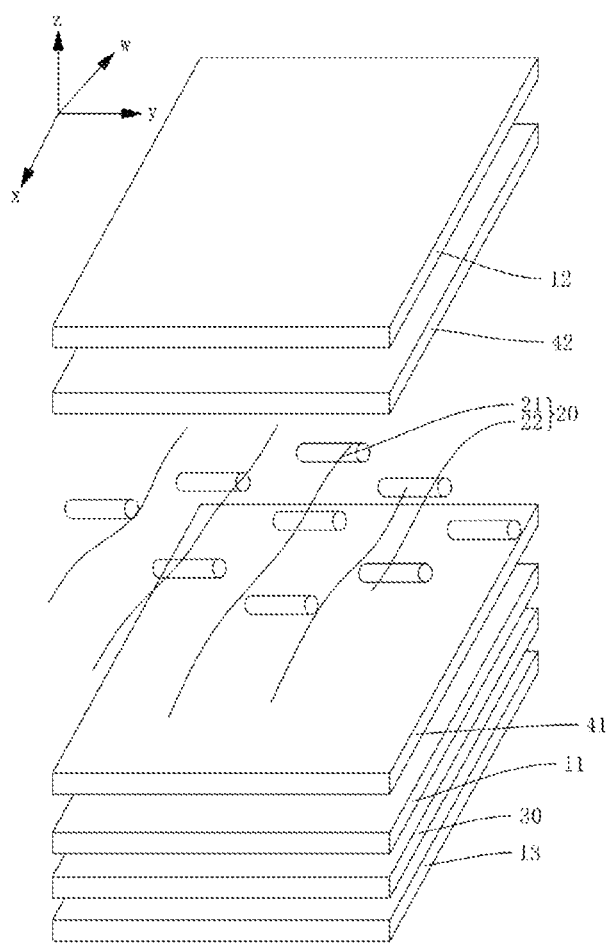
FIG. 6 is a schematic diagram of another three-dimensional structure of a display panel according to an embodiment of the present disclosure.

In another embodiment of the present disclosure, referring to FIGS. 5 and 6, when the plurality of liquid crystal molecules 22 are negative liquid crystals, the second direction is perpendicular to the normal direction z of the first polarizer 11. In this case, the polarization directions of the first light 61 and the second light 62 are both parallel to the long axes of the plurality of liquid crystal molecules, and the first light 61 and the second light 62 both do no deflect during passing through the dimming liquid crystal layer 20. That is, when the first light 61 and the second light 62 reach the second polarizer 12, the polarization directions of the first light 61 and the second light 62 are both parallel to the third direction y, and the first light 61 and the second light 62 can both pass through the second polarizer 12, to cause the display panel to be in the second mode. In addition, the display panel provided in the embodiments of the present disclosure may not affect, in the second mode, light passing through the panel body 30 and the first polarizer 11, thereby further improving a display effect of the display panel in the second mode.

It should be noted that, in the embodiments of the present disclosure, when the display panel is in the second mode, an arrangement direction of the plurality of liquid crystal molecules 22 is different from an arrangement direction of the plurality of polymer networks 21, so that when the first light 61 and the second light 62 may be both scattered during passing through the dimming liquid crystal layer 20, and a viewing angle range of emergent light may be more uniform, thereby further improving the display effect in the second mode.

In the embodiments of the present disclosure, the plurality of polymer networks 21 are arranged in the first direction w. Optionally, an angle between the first direction w and the normal direction of the first polarizer 11 is greater than or equal to 1°, and is less than or equal to 89°.

Preferably, the angle between the first direction w and the normal direction of the first polarizer 11 is greater than or equal to 55° and is less than or equal to 89°.

Figure 7:
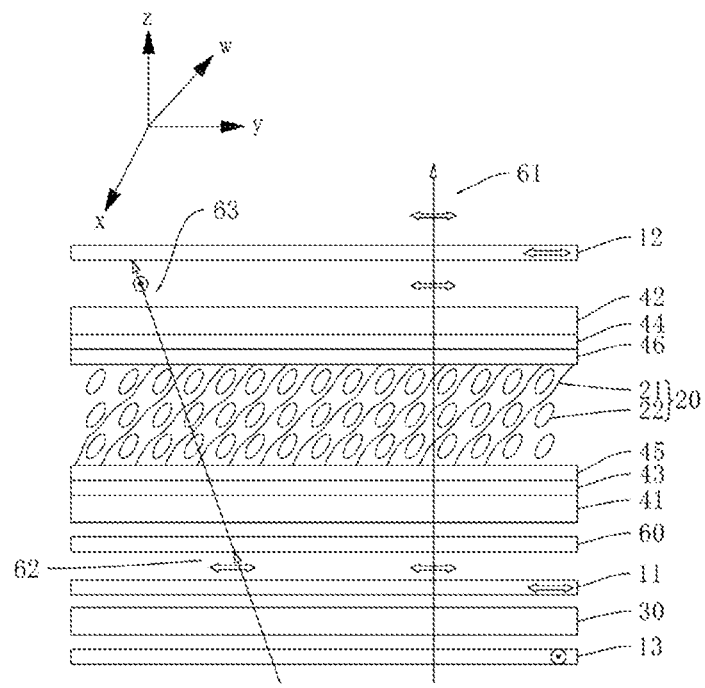
FIG. 7 is a schematic diagram of another structure of a display panel according to an embodiment of the present disclosure.

In addition, referring to FIG. 7, the display panel further includes a phase compensation module 60 disposed between the first polarizer 11 and the first substrate 41. That is, the phase compensation module 60 is located between the first polarizer 11 and the dimming liquid crystal layer 20. In addition, the display panel provided in the embodiments of the present disclosure adds the phase compensation module 60 to improve a large viewing angle display effect of the display panel in the second mode.

The phase compensation module 60 includes a positive single-axis C-type compensation film, a negative single-axis C-type compensation film, or at least one A-type compensation film.

Optionally, the at least one A-type compensation film includes a first A-type compensation film and a second A-type compensation film stacked, and an optical axis direction of the first A-type compensation film and an optical axis direction of the second A-type compensation film are arranged orthogonally.

Figure 8:
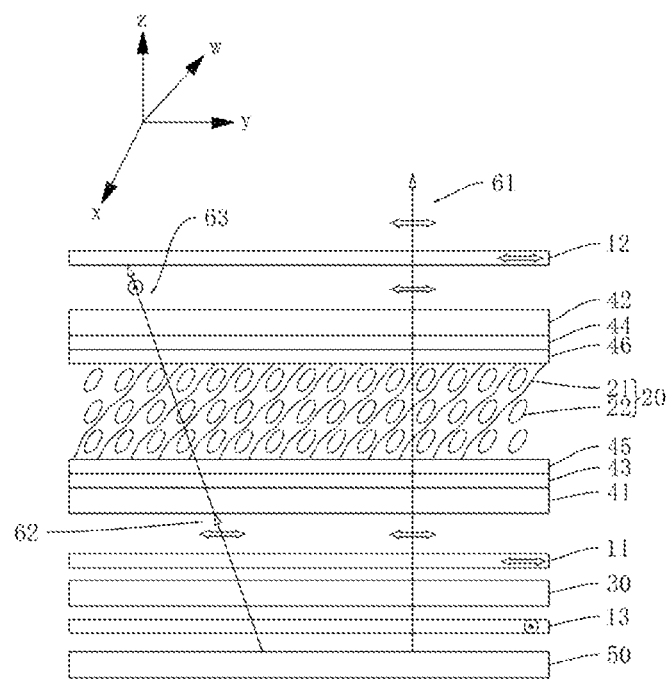
FIG. 8 is a schematic diagram of a structure of a display device according to an embodiment of the present disclosure.

FIG. 8 is a display device according to an embodiment of the present disclosure. The display device includes the display panel described in the foregoing embodiments and a backlight module 50 connected to one side of the display panel, and the backlight module 50 is disposed on one side of the third polarizer 13 away from the panel body 30, to provide a backlight source for the display panel.

Preferably, the backlight module 50 includes a collimating backlight source. Further, in the display device provided in the present embodiment of the present disclosure, when the display panel is in the first mode, an amount of light incident in the normal direction of the first polarizer 11 may be increased, and display luminance at a front viewing angle in the first mode is further increased, thereby improving the display effect in the first mode. When the display panel is in the second mode, since the arrangement direction of the plurality of liquid crystal molecules 22 and a tilt direction of the plurality of polymer networks 21 are different, light passing through the dimming liquid crystal layer 20 may be scattered, so that light of the collimating backlight source is scattered, to improve the large viewing angle visibility in the second mode, thereby causing the display device to still have a good wide viewing angle display effect in the second mode.

It should be noted that, the backlight module 50 provided in the present embodiment of the present disclosure is not limited to the collimating backlight source, but may be another conventional backlight source such as an edge-type backlight source. This is not limited herein.

Based on the above, the embodiments of the present disclosure arrange the plurality of polymer networks 21 in the dimming liquid crystal layer 20 in a direction inclined to the normal direction z of the first polarizer 11, to provide a directing effect to the plurality of liquid crystal molecules 22, so that the long axes of the plurality of liquid crystal molecules 22 are also inclined to the normal direction z of the first polarizer 11. Due to a light deflection characteristic of the plurality of liquid crystal molecules 22, first light incident in the normal direction z of the first polarizer 11 passes through the second polarizer 12, and second light incident in a direction inclined to the normal direction z of the first polarizer 11 is blocked or partially blocked by the second polarizer 12. The display panel provided in the embodiments of the present disclosure can selectively transmit light at different viewing angles, to further play a role of anti-spy at a specific viewing angle. In addition, the display panel provided in the present disclosure may further switch between anti-spy display and general display, to improve the applicability of the display panel.

Figure 9:
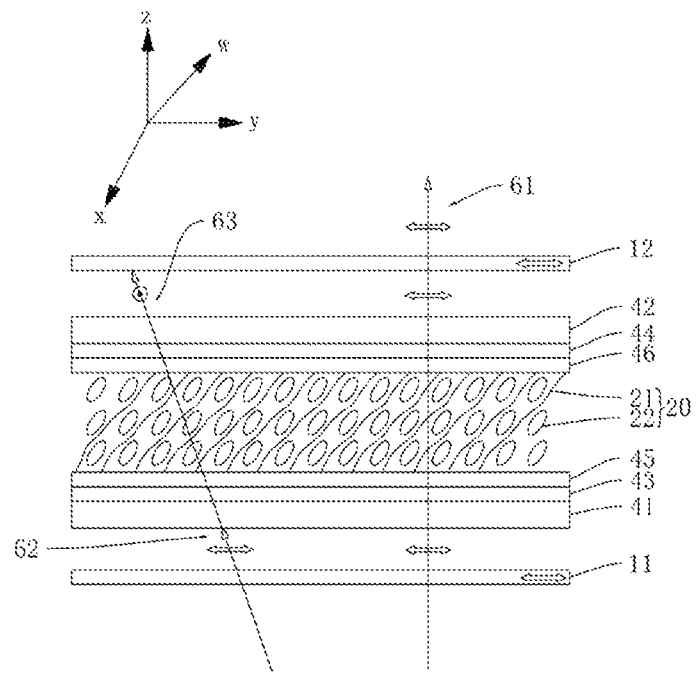
FIG. 9 is a schematic diagram of a structure of a privacy filter according to an embodiment of the present disclosure.
Figure 10:
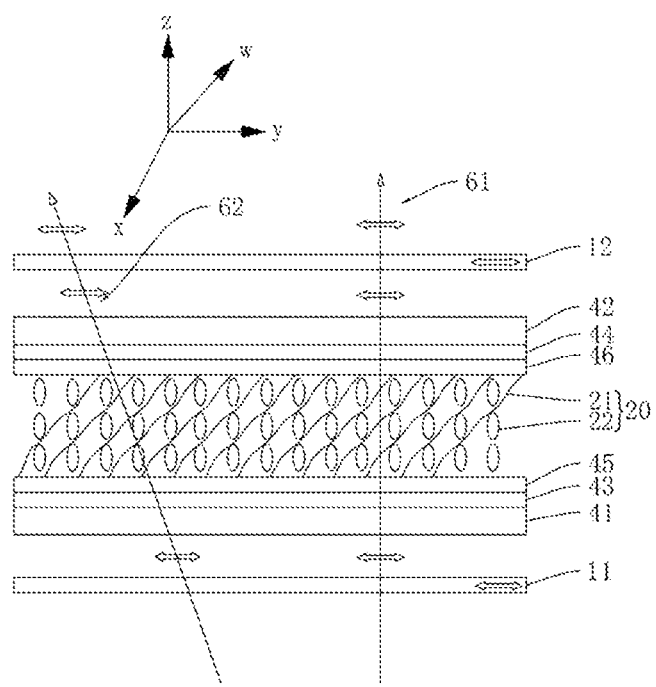
FIG. 10 is a schematic diagram of another structure of a privacy filter according to an embodiment of the present disclosure.
Figure 11:
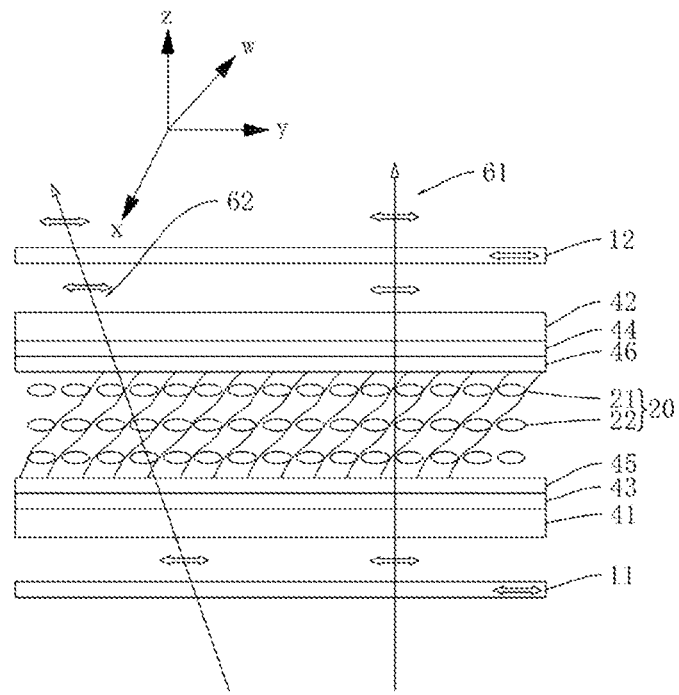
FIG. 11 is a schematic diagram of another structure of a privacy filter according to an embodiment of the present disclosure.

In addition, an embodiment of the present disclosure further provides a privacy filter. Referring to FIGS. 9, 10, and 11, the privacy filter includes a first polarizer 11 and a second polarizer 12 that are disposed opposite to each other, and a dimming liquid crystal layer 20 disposed between the first polarizer 11 and the second polarizer 12, wherein an optical axis direction of the first polarizer 11 is parallel to an optical axis direction of the second polarizer 12.

The dimming liquid crystal layer 20 includes a plurality of polymer networks 21 and a plurality of liquid crystal molecules 22 distributed in the plurality of polymer networks 21, wherein the plurality of polymer networks 21 are arranged in a first direction w, and the first direction w tilts relative to a normal direction of the first polarizer 11.

In a first mode, long axes of the plurality of liquid crystal molecules 22 are arranged in the first direction w.

In a second mode, the long axes of the plurality of liquid crystal molecules 22 are arranged in a second direction, the second direction is different from the first direction w, and a viewing angle of the privacy filter in the first model is less than a viewing angle of the privacy filter in the second mode.

It should be noted that, in the present embodiment of the present disclosure, the first mode of the privacy filter may be an anti-spy mode, and the second mode of the privacy filter may be a transmission mode. In addition, as shown in FIG. 9, the dimming liquid crystal layer 20 is configured to, in the first mode, cause first light 61 incident in a normal direction z of the first polarizer 11 to pass through the second polarizer 12, and cause second light 62 incident in a direction inclined to the normal direction z of the first polarizer 11 to be blocked or partially blocked by the second polarizer 12. Alternatively, as shown in FIG. 10 or FIG. 11, in the second mode, the long axes of the plurality of liquid crystal molecules 22 are arranged in the second direction to cause the privacy filter to be in the second mode, and the second direction is different from the first direction to cause more light to pass through the second polarizer 12, to improve a viewing angle range of the display panel in the second mode, thereby causing a viewing angle of the privacy filter in the second mode to be greater than a viewing angle of the privacy filter in the first mode.

Described in detail, still referring to FIGS. 9, 10, and 11, in the present embodiment of the present disclosure, the optical axis direction of the first polarizer 11 is parallel to the optical axis direction of the second polarizer 12. Optionally, in the embodiments of the present disclosure, the optical axis direction of the first polarizer 11 and the optical axis direction of the second polarizer 12 are both parallel to a third direction y, and the optical axis direction of the third polarizer 13 is parallel to a fourth direction x. The dimming liquid crystal layer 20 is disposed between the first polarizer 11 and the second polarizer 12, to implement an anti-spy function of the privacy filter.

Described in detail, the privacy filter further includes a first substrate 41 and a second substrate 42 that are disposed opposite to each other, a first electrode layer 43 disposed on one side of the first substrate 41 close to the second substrate 42, a second electrode layer 44 disposed on one side of the second substrate 42 close to the first substrate 41, a first alignment layer 45 disposed on one side of the first electrode layer 43 close to the second electrode layer 44, a second alignment layer 46 disposed on one side of the second electrode layer 44 close to the first electrode layer 43, and the dimming liquid crystal layer 20 disposed between the first alignment layer 45 and the second alignment layer 46.

It should be noted that, in the embodiments of the present disclosure, the first substrate 41 and the second substrate 42 are disposed between the first polarizer 11 and the second polarizer 12, the first substrate 41 is located between the first polarizer 11 and the second substrate 42, and the second substrate 42 is located between the first substrate 41 and the second polarizer 12, so that the dimming liquid crystal layer 20 is further located between the first polarizer 11 and the second polarizer 12.

In the embodiments of the present disclosure, the dimming liquid crystal layer 20 includes a plurality of polymer networks 21 disposed between the first alignment layer 45 and the second alignment layer 46 and a plurality of liquid crystal molecules 22 distributed in the plurality of polymer networks 21, and the plurality of polymer networks 21 are arranged in the first direction w, to provide a directing effect to the plurality of liquid crystal molecules 22 located in the polymer networks in the first direction w. In addition, pre-tilt directions formed by the first alignment layer 45 and the second alignment layer 46 in an alignment process are both parallel to the first direction w, so that the plurality of polymer networks 21 arranged in the first direction w are obtained in manufacturing.

In the embodiments of the present disclosure, the first electrode layer 43 and the second electrode layer 44 are configured to load voltages to control the long axes of the plurality of liquid crystal molecules 22 to switch between the first direction w and the second direction. When a voltage difference between the first electrode layer 43 and the second electrode layer 44 is less than a threshold, the long axes of the plurality of liquid crystal molecules 22 are arranged in the first direction w, and when the voltage difference between the first electrode layer 43 and the second electrode layer 44 is greater than the threshold, the long axes of the plurality of liquid crystal molecules 22 are arranged in the second direction. The threshold may be selected according to an actual requirement and is not limited herein.

Optionally, when the first electrode layer 43 and the second electrode layer 44 do not apply voltages, the plurality of liquid crystal molecules 22 are arranged in the first direction w, to cause the privacy filter to be in the first mode. The dimming liquid crystal layer 20 is configured to, in the first mode, cause the first light incident in the normal direction z of the first polarizer 11 to pass through the second polarizer 12, and cause the second light incident in a direction inclined to the normal direction z of the first polarizer 11 to be blocked or partially blocked by the second polarizer 12.

It should be noted that, when the privacy filter is in the first mode, orthogonal projections of the long axes of the plurality of liquid crystal molecules 22 on the first polarizer 11 are parallel to an optical axis of the first polarizer 11.

Described in detail, after the first light 61 and the second light 62 pass through the first polarizer 11, a polarization direction of the first light 61 and a polarization direction of the second light 62 are both parallel to the optical axis direction of the first polarizer 11, namely, the third direction y.

It should be noted that, both the first light 61 and the second light 62 spread in an x-z plane, the plurality of polymer networks 21 and the plurality of liquid crystal molecules 22 are obliquely arranged in a y-z plane, the first light 61 is incident into the dimming liquid crystal layer 20 in the normal direction z of the first polarizer 11, and the second light 62 is incident into the dimming liquid crystal layer 20 in a direction inclined to the normal direction z of the first polarizer 11. Since the first light 61 is incident in the normal direction of the first polarizer 11, the first light 61 is in a same plane as the plurality of liquid crystal molecules 22 in a three-dimensional space, and the polarization direction of the first light 61 only pass through the long axes of the plurality of liquid crystal molecules 22. Therefore, no phase difference is generated after the first light 61 passes through the dimming liquid crystal layer 20, namely, the first light does not deflect. When the first light 61 reaches the second polarizer 12, the polarization direction of the first light is still the third direction y, so that the first light may pass through the second polarizer 12.

In addition, an incident direction of the second light 62 is inclined to the normal direction z of the first polarizer 11, so that in a three-dimensional space, the polarization direction of the second light 62 and the long axes of the plurality of liquid crystal molecules 22 form a certain angle. Therefore, a phase difference may be generated after the second light 62 passes through the dimming liquid crystal layer 20, namely, the second light deflects. The second light 62 deflects into third light 63, and the polarization direction changes, so that the second light cannot directly pass through the second polarizer 12. If a polarization direction of the third light 63 is perpendicular to the third direction y, as shown in FIG. 9, the third light 63 may be totally blocked by the second polarizer 12. In this case, the user can only view display of luminance at a front viewing angle, and no luminance is displayed at other viewing angles, to play a role of anti-spy. If the polarization direction of the third light 63 forms an acute angle with both the third direction y and the fourth direction x, the third light 63 is decomposed in the third direction y and the fourth direction x, wherein only a part of third light 63 decomposed in the third direction y can pass through the second polarizer. In this case, the user can view normally at a front viewing angle, and display luminance may be relatively dark at other viewing angles, to play a role of anti-spy.

Further, in a process that the second light 62 deflects into the third light 63, light spreads in two directions of the plurality of liquid crystal molecules 22, to further generate a phase difference, and the phase difference $Re=\lambda/2+n\lambda$ (n is an integer), wherein $\lambda$ is a wavelength of light in a vacuum. As can be learned from the formula, when a vibration direction of polarized light of the second light 62 and the long axes of the plurality of liquid crystal molecules 22 form an angle of 45°, the polarization direction deflects by 90° after the second light 62 passes through the plurality of liquid crystal molecules 22. That is, the polarization direction of the obtained third light 63 is parallel to the fourth direction x, and the third light 63 is totally blocked by the second polarizer 12.

Optionally, when the first electrode layer 43 and the second electrode layer 44 apply voltages, the plurality of liquid crystal molecules 22 may be controlled to deflect, to cause the long axes of the plurality of liquid crystal molecules 22 to be arranged in the second direction, and the second direction is different from the first direction w, so as to cause the privacy filter to be in the second mode.

In an embodiment of the present disclosure, referring to FIG. 10, when the plurality of liquid crystal molecules 22 are positive liquid crystals, the second direction is parallel to the normal direction z of the first polarizer 11. In this case, the polarization directions of the first light 61 and the second light 62 are both parallel to short axes of the plurality of liquid crystal molecules, and the first light 61 and the second light 62 both do no deflect during passing through the dimming liquid crystal layer 20. That is, when the first light 61 and the second light 62 reach the second polarizer 12, the polarization directions of the first light 61 and the second light 62 are both parallel to the third direction y, and the first light 61 and the second light 62 can both pass through the second polarizer 12, to cause the privacy filter to be in the second mode.

In another embodiment of the present disclosure, referring to FIG. 11, when the plurality of liquid crystal molecules 22 are negative liquid crystals, the second direction is perpendicular to the normal direction z of the first polarizer 11. In this case, the polarization directions of the first light 61 and the second light 62 are both parallel to the long axes of the plurality of liquid crystal molecules, and the first light 61 and the second light 62 both do no deflect during passing through the dimming liquid crystal layer 20. That is, when the first light 61 and the second light 62 reach the second polarizer 12, the polarization directions of the first light 61 and the second light 62 are both parallel to the third direction y, and the first light 61 and the second light 62 can both pass through the second polarizer 12, to cause the privacy filter to be in the second mode.

It should be noted that, in the embodiments of the present disclosure, when the privacy filter is in the second mode, an arrangement direction of the plurality of liquid crystal molecules 22 is different from an arrangement direction of the plurality of polymer networks 21, so that when the first light 61 and the second light 62 may be both scattered during passing through the dimming liquid crystal layer 20, and a viewing angle range of emergent light may be more uniform, thereby further improving large viewing angle luminance of light in the second mode.

Figure 12:
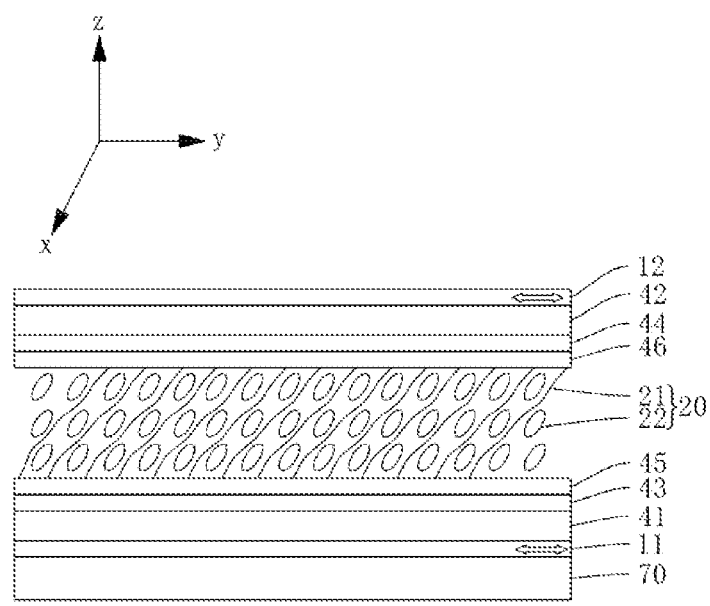
FIG. 12 is a schematic diagram of a luminance test structure of a privacy filter according to an embodiment of the present disclosure.
Figure 13:
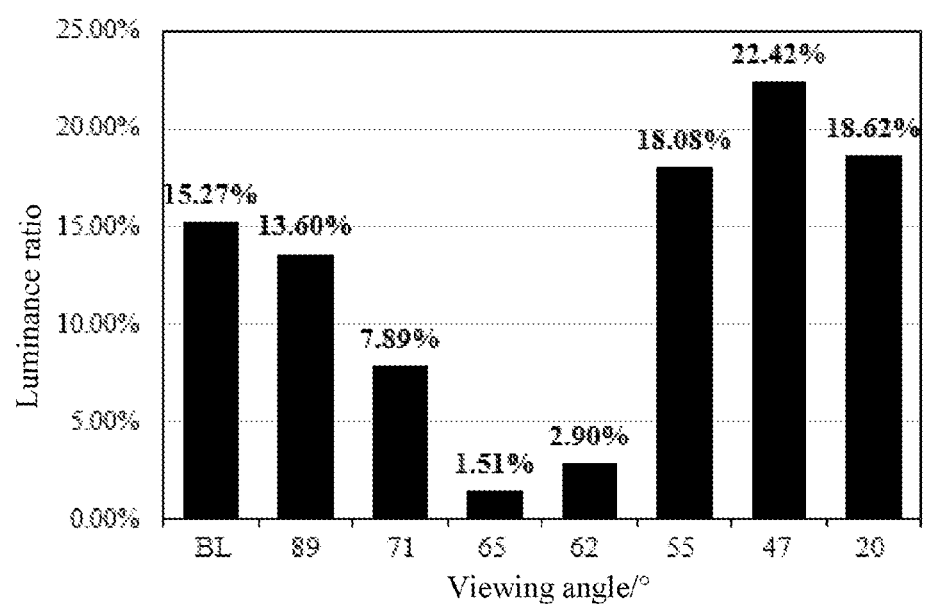
FIG. 13 is a bar graph of luminance test data of a privacy filter according to an embodiment of the present disclosure.

Further, the present embodiment of the present disclosure tests a viewing angle range of the privacy filter in the first mode, a test structure of the privacy filter is shown in FIG. 12, and a result shown in FIG. 13 is obtained. FIG. 12 includes a privacy filter and a test backlight module 70 disposed on one side of the privacy filter according to an embodiment of the present disclosure. A horizontal coordinate in FIG. 13 is a tilt angle of the plurality of polymer networks 21, namely, an angle between the first direction w and the normal direction of the first polarizer 11, a longitudinal coordinate is a ratio of luminance at a 45-degree viewing angle to luminance at a front viewing angle, and BL in the horizontal coordinate in the figure represents a ratio of luminance at the 45-degree viewing angle to luminance at the front viewing angle of the test backlight module 70.

The test backlight module 70 is disposed on one side including the first polarizer 11 of the privacy filter, performs a test by using a rapid viewing angle measurement system, wherein a model of a test instrument is Eldim/EZConrast MS88, and tests distribution of light intensity along with observation angles by using the device. In addition, as can be learned from FIG. 13, the luminance ratio represented by the longitudinal coordinate is a ratio of luminance at a 45-degree angle in the x-z plane to that in a z-axis direction, and the tilt angle of the plurality of polymer networks 21 is in a range of 55° to 89°, so that an anti-spy effect of the privacy filter is relatively good. That is, in the privacy filter provided in the present embodiment of the present disclosure, the angle between the first direction w and the normal direction of the first polarizer 11 is greater than or equal to 55° and is less than or equal to 89°.

Preferably, When the tilt direction of the plurality of polymer networks 21 is 65°, a luminance ratio of the privacy filter is 1.51%, and the luminance is the darkest. That is, when the angle between the first direction w and the normal direction of the first polarizer 11 is 65°, the privacy filter provided in the present embodiment of the present disclosure has a best anti-spy effect.

Based on the above, the privacy filter provided in the present embodiment of the present disclosure can selectively transmit light at different viewing angles, to further play a role of anti-spy at a specific viewing angle. In addition, the privacy filter provided in the present disclosure may further switch between the first mode and the second mode, to improve the applicability of the privacy filter.

In the foregoing embodiments, description of each embodiment focuses on a different part, and for parts that are not described in detail in one embodiment, reference may be made to the related description of other embodiments.

The foregoing describes the privacy filter, the display panel, and the display device provided in the embodiments of the present disclosure in detail, description is made on the principle and implementations of the present disclosure in this specification by using specific examples, and description of the foregoing embodiments is merely used for helping understand the technical solutions and a core idea of the present disclosure. It should be understood by a person of ordinary skill in the art that modifications can be still made to the technical solutions described in the foregoing embodiments, or equivalent replacements can be made to some technical features in the technical solutions, as long as such modifications or replacements do not cause the essence of corresponding technical solutions to depart from the scope of the technical solutions of the embodiments of the present disclosure.

What is claimed is:

1. A display panel, comprising a panel body;
   a first polarizer, disposed on one side of the panel body;
   a dimming liquid crystal layer, disposed on one side of the first polarizer away from the panel body and comprising a plurality of polymer networks and a plurality of liquid crystal molecules distributed in the polymer networks, wherein each of the plurality of polymer networks is extended in a first direction, and the first direction tilts relative to a normal direction of the first polarizer; and
   a second polarizer, disposed on one side of the dimming liquid crystal layer away from the first polarizer, an optical axis direction of the first polarizer being parallel to an optical axis direction of the second polarizer, wherein
   in a first mode, each of long axes of the plurality of liquid crystal molecules is extended in the first direction; and
   in a second mode, each of the long axes of the plurality of liquid crystal molecules is extended in a second direction, the second direction is different from the first direction, and a viewing angle of the display panel in the first model is less than a viewing angle of the display panel in the second mode.

2. The display panel as claimed in claim 1, wherein when the display panel is in the first mode, orthogonal projections of the long axes of the plurality of liquid crystal molecules on the first polarizer are parallel to an optical axis of the first polarizer.

3. The display panel as claimed in claim 1, wherein an angle between the first direction and the normal direction of the first polarizer is an acute angle.

4. The display panel as claimed in claim 3, wherein the angle between the first direction and the normal direction of the first polarizer is greater than or equal to 1° and is less than or equal to 89°.

5. The display panel as claimed in claim 3, wherein the angle between the first direction and the normal direction of the first polarizer is greater than or equal to 55° and is less than or equal to 89°.

6. The display panel as claimed in claim 1, wherein a first electrode layer is disposed between the first polarizer and the dimming liquid crystal layer, and a second electrode layer is disposed between the second polarizer and the dimming liquid crystal layer, wherein the first electrode layer and the second electrode layer are configured to load voltages to control the long axes of the plurality of liquid crystal molecules to switch between the first direction and the second direction.

7. The display panel as claimed in claim 6, wherein a first alignment layer is disposed between the first electrode layer and the dimming liquid crystal layer, a second alignment layer is disposed between the second electrode layer and the dimming liquid crystal layer, and both a pre-tilt direction of the first alignment layer and a pre-tilt direction of the second alignment layer are parallel to the first direction.

8. The display panel as claimed in claim 1, wherein the plurality of liquid crystal molecules are positive liquid crystals, and the second direction is parallel to the normal direction of the first polarizer; or
   the plurality of liquid crystal molecules are negative liquid crystals, and the second direction is perpendicular to the normal direction of the first polarizer.

9. The display panel as claimed in claim 1, wherein the display panel further comprises a third polarizer disposed on one side of the panel body away from the first polarizer, and an optical axis direction of the third polarizer is perpendicular to the optical axis direction of the first polarizer.

10. The display panel as claimed in claim 1, wherein the display panel further comprises a phase compensation module disposed between the first polarizer and the dimming liquid crystal layer, and the phase compensation module comprises a positive single-axis C-type compensation film, a negative single-axis C-type compensation film, or at least one A-type compensation film.

11. The display panel as claimed in claim 10, wherein the phase compensation module comprises a first A-type compensation film and a second A-type compensation film stacked, and an optical axis direction of the first A-type compensation film and an optical axis direction of the second A-type compensation film are arranged orthogonally.

12. A display device, comprising a display panel and a backlight module located on one side of the display panel, the display panel comprising:
    a panel body;
    a first polarizer, disposed on one side of the panel body;
    a dimming liquid crystal layer, disposed on one side of the first polarizer away from the panel body and comprising a plurality of polymer networks and a plurality of liquid crystal molecules distributed in the polymer networks, wherein each of the plurality of polymer networks is extended in a first direction, and the first direction tilts relative to a normal direction of the first polarizer; and
    a second polarizer, disposed on one side of the dimming liquid crystal layer away from the first polarizer, an optical axis direction of the first polarizer being parallel to an optical axis direction of the second polarizer, wherein
    in a first mode, each of long axes of the plurality of liquid crystal molecules is extended in the first direction; and
    in a second mode, each of the long axes of the plurality of liquid crystal molecules is extended in a second direction, the second direction is different from the first direction, and a viewing angle of the display panel in the first model is less than a viewing angle of the display panel in the second mode.

13. The display device as claimed in claim 12, wherein the backlight module comprises a collimating backlight source.

14. A privacy filter, comprising:
a first polarizer;
a dimming liquid crystal layer, disposed on one side of the first polarizer and comprising a plurality of polymer networks and a plurality of liquid crystal molecules distributed in the polymer networks, wherein each of the plurality of polymer networks is extended in a first direction, and the first direction tilts relative to a normal direction of the first polarizer; and
a second polarizer, disposed on one side of the dimming liquid crystal layer away from the first polarizer, an optical axis direction of the first polarizer being parallel to an optical axis direction of the second polarizer, wherein
in a first mode, each of long axes of the plurality of liquid crystal molecules is extended in the first direction; and
in a second mode, each of the long axes of the plurality of liquid crystal molecules is extended in a second direction, the second direction is different from the first direction, and a viewing angle of the privacy filter in the first model is less than a viewing angle of the privacy filter in the second mode.

15. The privacy filter as claimed in claim 14, wherein when the privacy filter is in the first mode, orthogonal projections of the long axes of the plurality of liquid crystal molecules on the first polarizer are parallel to an optical axis of the first polarizer.

16. The privacy filter as claimed in claim 14, wherein an angle between the first direction and the normal direction of the first polarizer is an acute angle.

17. The privacy filter as claimed in claim 16, wherein the angle between the first direction and the normal direction of the first polarizer is greater than or equal to 55° and is less than or equal to 89°.

18. The privacy filter as claimed in claim 14, wherein a first electrode layer is disposed between the first polarizer and the dimming liquid crystal layer, and a second electrode layer is disposed between the second polarizer and the dimming liquid crystal layer, wherein the first electrode layer and the second electrode layer are configured to load voltages to control the long axes of the plurality of liquid crystal molecules to switch between the first direction and the second direction.

19. The privacy filter as claimed in claim 18, wherein a first alignment layer is disposed between the first electrode layer and the dimming liquid crystal layer, a second alignment layer is disposed between the second electrode layer and the dimming liquid crystal layer, and both a pre-tilt direction of the first alignment layer and a pre-tilt direction of the second alignment layer are parallel to the first direction.

20. The privacy filter as claimed in claim 14, wherein the plurality of liquid crystal molecules are positive liquid crystals, and the second direction is parallel to the normal direction of the first polarizer; or
the plurality of liquid crystal molecules are negative liquid crystals, and the second direction is perpendicular to the normal direction of the first polarizer.

* * * * *